US012779914B2

(12) United States Patent
Bill

(10) Patent No.: US 12,779,914 B2
(45) Date of Patent: Nov. 3, 2026

(54) SENSOR FOR WHEEL ASSEMBLY

(71) Applicant: AIRBUS OPERATIONS LIMITED, Bristol (GB)

(72) Inventor: Andrew Bill, Bristol (GB)

(73) Assignee: Airbus Operations Limited, Bristol (GB)

( * ) Notice: Subject to any disclaimer, the term of this patent is extended or adjusted under 35 U.S.C. 154(b) by 706 days.

(21) Appl. No.: 18/258,163

(22) PCT Filed: Dec. 16, 2021

(86) PCT No.: PCT/EP2021/086082
§ 371 (c)(1),
(2) Date: Jun. 16, 2023

(87) PCT Pub. No.: WO2022/129276
PCT Pub. Date: Jun. 23, 2022

(65) Prior Publication Data

US 2024/0051355 A1 Feb. 15, 2024

(30) Foreign Application Priority Data

Dec. 16, 2020 (GB) ..................................... 2019869

(51) Int. Cl.
*B60C 23/04* (2006.01)
*B60C 11/24* (2006.01)
*B60C 23/20* (2006.01)

(52) U.S. Cl.
CPC ........ *B60C 23/0498* (2013.01); *B60C 11/243* (2013.01); *B60C 23/0488* (2013.01); *B60C 23/20* (2013.01)

(58) Field of Classification Search
None
See application file for complete search history.

(56) References Cited

U.S. PATENT DOCUMENTS

| | | | |
|---|---|---|---|
| 7,775,096 B2 | 8/2010 | Ivory et al. |
| 8,742,912 B2 | 6/2014 | Blanchard |
| 8,841,785 B2 | 9/2014 | Theuss |
| 9,776,462 B1 | 10/2017 | Gray |
| 10,035,387 B2 | 7/2018 | Carresjö et al. |

(Continued)

FOREIGN PATENT DOCUMENTS

| | | |
|---|---|---|
| CN | 106364263 | 2/2017 |
| CN | 107116968 | 9/2017 |

(Continued)

OTHER PUBLICATIONS

Office Action for U.S. Appl. No. 18/257,771, 19 pages, dated Oct. 16, 2024.

(Continued)

*Primary Examiner* — Luke D Ratcliffe
(74) *Attorney, Agent, or Firm* — Nixon & Vanderhye P.C.

(57) ABSTRACT

A sensor device for use in determining at least one property of a wheel assembly including a tire mounted on a wheel. The sensor device is configured to be attachable to an outer circumferential surface of the wheel which faces an inner circumferential surface of the tire. The sensor device is configured to measure a distance between the sensor device and an object remote from the sensor device.

25 Claims, 5 Drawing Sheets

(56) References Cited

U.S. PATENT DOCUMENTS

| | | | | |
|---|---|---|---|---|
| 11,110,758 | B1 | 9/2021 | Dages et al. | |
| 2002/0148286 | A1 | 10/2002 | Losey | |
| 2003/0154007 | A1* | 8/2003 | Evans | B60T 8/1725 701/514 |
| 2004/0154388 | A1 | 8/2004 | Wilson et al. | |
| 2004/0182146 | A1 | 9/2004 | Wilson | |
| 2004/0211250 | A1 | 10/2004 | Adamson | |
| 2005/0251306 | A1 | 11/2005 | Gowan et al. | |
| 2006/0243043 | A1 | 11/2006 | Breed | |
| 2008/0144985 | A1 | 6/2008 | Joki et al. | |
| 2009/0038414 | A1 | 2/2009 | Ozaki et al. | |
| 2012/0255349 | A1 | 10/2012 | Pop | |
| 2013/0312509 | A1 | 11/2013 | Solomon et al. | |
| 2013/0342341 | A1 | 12/2013 | Simmerman et al. | |
| 2014/0150542 | A1 | 6/2014 | Townsend et al. | |
| 2015/0153250 | A1* | 6/2015 | Yeom | B60C 23/066 73/146 |
| 2015/0217607 | A1* | 8/2015 | Singh | B60C 23/0488 73/146.3 |
| 2016/0334209 | A1 | 11/2016 | Linson | |
| 2019/0329809 | A1 | 10/2019 | Mackay | |
| 2020/0122529 | A1 | 4/2020 | Skjermo et al. | |
| 2020/0290411 | A1* | 9/2020 | Bickard | B60C 23/0488 |
| 2023/0271580 | A1 | 8/2023 | Lammers | |
| 2023/0348009 | A1 | 11/2023 | Griswold | |
| 2024/0131879 | A1 | 4/2024 | Jain | |

FOREIGN PATENT DOCUMENTS

| | | | |
|---|---|---|---|
| CN | 107160951 | | 9/2017 |
| CN | 110920632 | | 3/2020 |
| DE | 10 2007 010 782 | | 2/2008 |
| DE | 10 2008 060 542 | | 6/2010 |
| DE | 10 2010 016 378 | | 10/2011 |
| DE | 10 2010 037 597 | | 3/2012 |
| DE | 102016201591 | A1 | 10/2017 |
| DE | 102018214472 | A1 | 2/2020 |
| EP | 3 118 030 | | 1/2017 |
| EP | 3599113 | A1 | 1/2020 |
| EP | 3 862 197 | | 8/2021 |
| GB | 2461928 | | 1/2010 |
| JP | 5967307 | | 5/1984 |
| JP | 2004-284396 | | 10/2004 |
| JP | 4198817 | | 12/2008 |
| JP | 4735079 | | 7/2011 |
| KR | 20080035073 | | 4/2008 |
| WO | 01/54955 | | 8/2001 |

OTHER PUBLICATIONS

Office Action for U.S. Appl. No. 18/257,823, 29 pages, dated Sep. 26, 2024.

International Search Report and Written Opinion cited in PCT/EP2021/085845, mailed Apr. 20, 2022, 13 pages.

Combined Search and Examination Report cited in GB2019750.5 mailed May 20, 2021, 7 pages.

International Search Report and Written Opinion cited in PCT/EP2021/085847, mailed May 2, 2022, 12 pages.

Combined Search and Examination Report cited in GB2019753.9 mailed May 20, 2021, 7 pages.

International Search Report and Written Opinion cited in PCT/EP2021/085849, mailed May 2, 2022, 14 pages.

International Search Report and Written Opinion cited in PCT/EP2021/086080, mailed Apr. 20, 2022, 15 pages.

Combined Search and Examination Report cited in GB2019868.5 mailed May 11, 2021, 7 pages.

International Search Report and Written Opinion cited in PCT/EP2021/086082, mailed May 2, 2022, 15 pages.

Combined Search and Examination Report cited in GB2019869.3 mailed May 17, 2021, 8 pages.

U.S. Appl. No. 18/257,701, Office Action, May 28, 2025 (25 pages).

* cited by examiner

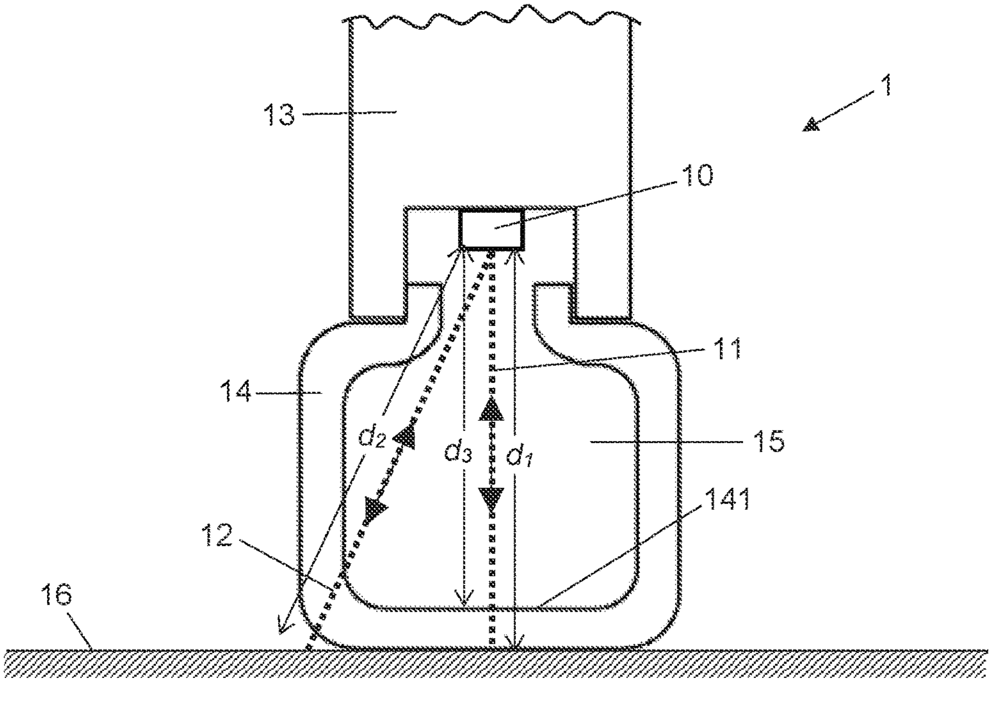
Fig. 1(iii)

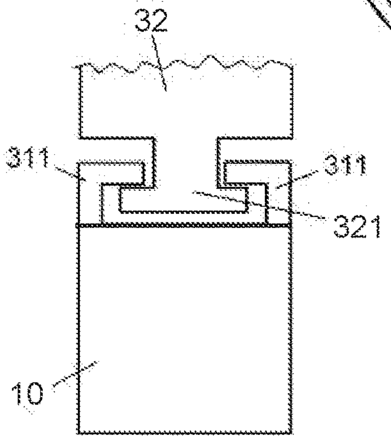
Fig. 3(iii)

SENSOR FOR WHEEL ASSEMBLY

RELATED APPLICATIONS

This application is the U.S. national phase of International Application No. PCT/EP2021/086082 filed Dec. 16, 2021, which designated the U.S. and claims priority to United Kingdom patent application GB 2019869.3, filed Dec. 16, 2020, the entire contents of each of which are hereby incorporated by reference.

TECHNICAL FIELD

The present invention relates to a sensor device configured to measure at least one property of a wheel assembly, to a wheel assembly comprising such a sensor device, to an aircraft comprising such a wheel assembly, and to a method of determining an operational parameter of a vehicle.

BACKGROUND

Monitoring properties of vehicle wheel assemblies, such as tire inflation, tread depth, and tire damage is an important part of vehicle maintenance. This is particularly true for aircraft, since the wheel assemblies of an aircraft routinely experience large loads and harsh operating conditions. Currently, many such checks of aircraft wheel assembly properties are performed manually, and involve a different process for each property. Automated systems exist for monitoring tire pressure, but these systems require a pressure sensor to be permanently installed on a wheel in a manner specific to the particular design of the wheel. For instance, the wheel must typically include a port to accommodate the sensor, and possibly also a counterweight feature. For other important wheel assembly properties which must be regularly checked no automated measurement systems exist.

The invention set out below seeks to provide an improved sensor device for use in determining at least one property of a wheel assembly.

SUMMARY

A first aspect of the present invention provides a sensor device for use in determining at least one property of a wheel assembly comprising a tire mounted on a wheel. The sensor device is configured to be attachable to an outer circumferential surface of the wheel which faces an inner circumferential surface of the tire. The sensor device is configured to measure a distance between the sensor device and an object remote from the sensor device.

Optionally, the sensor device is configured to measure any or all of: a distance between the sensor device and the inner circumferential surface of the tire, when the tire is mounted on the wheel; and a distance between the sensor device and the ground, when the wheel assembly is operating to support a vehicle.

Optionally, the sensor device is configured to be movably attachable to the outer circumferential surface of the wheel such that the sensor device is able to continuously travel around the circumference of the wheel in a given direction whilst the wheel remains stationary.

Optionally, the sensor device is configured to emit radiation in a direction toward the remote object when the sensor device is attached to the wheel; and to detect a reflection of the emitted radiation.

Optionally, the sensor device is configured to continuously emit the radiation and to continuously detect the reflection during a time period in which there is relative circumferential movement between the sensor device and the wheel.

Optionally, the sensor device is configured to emit the radiation in the form of a beam directed to align with a radial direction of the wheel when the sensor device is attached to the wheel.

Optionally, the sensor device is configured to emit a first beam of radiation in a first direction which is towards the inner circumferential surface of the tire when the sensor device is attached to the wheel, and a second beam of radiation in a second, different direction which is towards the inner circumferential surface of the tire when the sensor device is attached to the wheel. Optionally, an angle between the first beam and the second beam is less than 90°.

Optionally, the sensor device comprises a sensor controller configured to operate the sensor device according to a predetermined measurement protocol.

Optionally, the sensor controller is configured to select the predetermined measurement protocol from a set of two or more predetermined measurement protocols stored on a memory of the sensor controller, based on any one or more of: a command signal received by the sensor controller; a relative rotation state of the sensor device and the wheel; a parameter relating to the operation of a vehicle on which the wheel assembly is installed.

Optionally, at least one of the predetermined measurement protocols in the set is a scanning measurement protocol suitable for use only when there is relative rotation between the sensor device and the wheel.

Optionally, the predetermined measurement protocol is any one of: a damage measurement protocol; a tread depth measurement protocol; a load measurement protocol.

Optionally, a damage measurement protocol comprises emitting radiation such that it is incident on a substantially full width of an inner surface of a tire mounted on the wheel, and detecting reflections of the emitted radiation from the substantially full width of the inner surface of the tire, continuously over a time period in which the sensor device moves around at least a full circumference relative to the wheel.

Optionally, a tread depth measurement protocol comprises emitting a first beam of radiation such that it is incident on an inner surface of a tire mounted on the wheel and detecting reflections of the first beam from the inner surface; and emitting a second beam of radiation such that it is incident on a support surface in contact with an outer surface of the tire and detecting reflections of the second beam from the support surface.

Optionally, a load measurement protocol comprises emitting radiation such that it is incident on a reference circumferential surface of the tire, the reference surface having a known distance from an inner circumferential surface of the tire, and detecting reflections of the emitted radiation from the reference circumferential surface of the tire.

Optionally, the sensor device is further configured to measure one or more of: tire pressure; tire gas temperature; acceleration.

Optionally, the sensor device is further configured to measure tire pressure, and the load measurement protocol further comprises measuring tire pressure substantially simultaneously with emitting the radiation.

A second aspect of the invention provides a wheel assembly comprising a wheel having an outer circumferential surface configured to face an inner circumferential surface of a tire mounted on the wheel; and a sensor device according to any preceding claim attached to the outer circumferential surface of the wheel.

Optionally, the wheel assembly further comprises a tire mounted on the wheel, and the tire comprises a circumferential portion of reflective material which is configured to reflect a greater proportion of the emitted radiation than a material which forms the main body of the tire.

Optionally, the wheel assembly is an aircraft wheel assembly.

A third aspect of the invention provides an aircraft comprising a wheel assembly according to the second aspect.

Optionally, the aircraft further comprises an avionics system in communication with the sensor device.

A fourth aspect of the invention provides a method of determining an operational parameter of a vehicle. The method comprises:

providing a distance sensor in an enclosed space formed by a wheel of the vehicle and a tire mounted on the wheel;

performing a distance measurement using the distance sensor; and determining a value of the operational parameter based on the measured distance.

Optionally, the sensor is mounted on the wheel and the distance measured is a distance between the sensor and an object remote from the sensor.

Optionally, the method comprises:

performing the distance measurement when the sensor is disposed at a first circumferential location relative to the wheel;

performing a further distance measurement when the sensor is disposed at a second, different circumferential location relative to the wheel.

Optionally, the wheel is rotated about its axis between performing the distance measurement and performing the further distance measurement.

Optionally, the method comprises comprising performing a series of distance measurements, the series including the distance measurement and the further distance measurement, and each measurement of the series is performed when the sensor is at a different circumferential location relative to the wheel, and wherein the different circumferential locations are distributed around the circumference of the wheel.

BRIEF DESCRIPTION OF THE DRAWINGS

Embodiments of the invention will now be described, by way of example only, with reference to the accompanying drawings, in which.

DETAILED DESCRIPTION

Figure 1I:
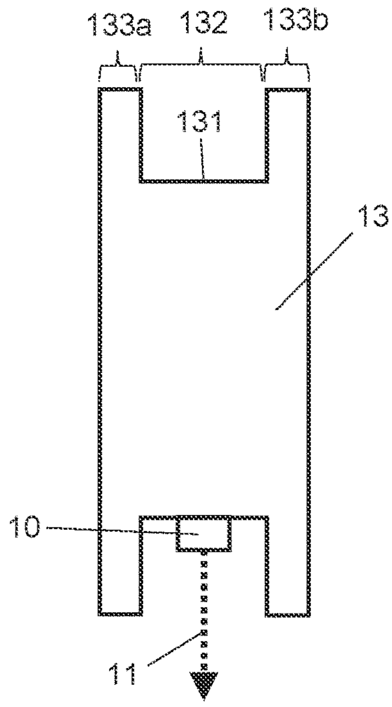
FIG. 1(*i*), FIG. 1(*ii*) and FIG. 1(*iii*) are a set of schematic views of an example sensor device according to the invention, in isolation and installed on a wheel assembly.

The following description provides several examples of sensor devices according to the invention. Each example sensor device is suitable for use in determining at least one property of a wheel assembly comprising a tire mounted on a wheel. Each example sensor device is configured to be attachable to an outer circumferential surface of the wheel which faces an inner circumferential surface of the tire. Furthermore, each example sensor device is configured to measure a distance between the sensor device and an object remote from the sensor device.

Example sensor devices according to the invention provide several advantages. Being configured to be attachable to an outer circumferential surface of a wheel which faces an inner circumferential surface of a tire mounted on the wheel means that the sensor device is located inside an enclosed space formed by the wheel and the tire and therefore has direct access to the gas in the tire and can perform accurate measurements of the properties of that gas. It also means that the sensor device is protected from the external environment of the wheel assembly and may therefore need to be less robust than a sensor device mounted externally on a wheel assembly.

Being configured to measure a distance between the sensor device and a remote object (which may be, for example, a part of the wheel assembly, a part of a vehicle in which the wheel assembly is comprised, or the ground) enables the sensor device to acquire measurement data from which various properties of the wheel assembly can be determined, meaning that multiple properties of a wheel assembly can be automatically monitored using just one sensor device. The manner in which these advantages are provided by the example sensor apparatus according to the invention will be explained further in the following description.

In examples described herein, references to “aircraft” include all kinds of aircraft, such as fixed wing military or commercial aircraft; unmanned aerial vehicles (UAVs); and rotary wing aircraft, such as helicopters.

It should be noted that the components shown in the drawings are not necessarily shown to scale.

Figure 1:
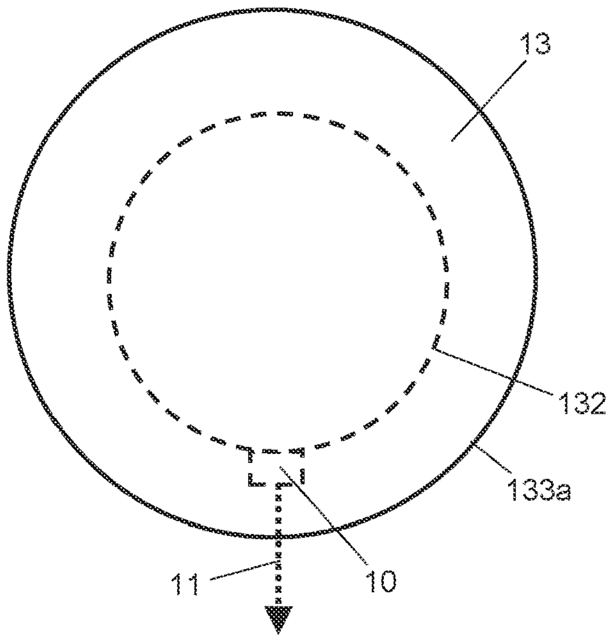

FIG. 1 shows a first example sensor device 10 according to the invention. The sensor device 10 is shown installed on a wheel 13 (parts (i) and (ii), and on a wheel assembly 1 (part (iii)) comprising the wheel 13 and a tire 14 mounted on the wheel 13. In the illustrated example the wheel 13 comprises a hub part 132 between two flange parts 133*a* and 133*b*. The sensor device 10 is attached to an outer circumferential surface 131 of the hub part 132 of the wheel 13. The surface 131 faces an inner circumferential surface 141 of the tire 14. The attachment of the sensor device 10 to the wheel 13 can be effected in various different ways, as will be further explained below.

The wheel assembly 1 is a wheel assembly for a vehicle. In some examples the wheel assembly 10 is an aircraft wheel assembly. In such examples the wheel 13 comprises an inboard wheel rim (comprising one of the flange parts 133*a* and a section of the hub part 132) and an outboard wheel rim (comprising the other one of the flange parts 133*b* and a further section of the hub part 132). The inboard wheel rim may house a brake assembly (not shown). The outboard wheel rim includes a valve (also not shown) for inflating the tire 14. To construct such an aircraft wheel assembly, the inboard and outboard wheel rims are bolted together with the tire 14 in between. The tire 14 is then pressurised via the valve, usually with nitrogen. The sensor device 10 may be attached to the wheel 13 before the inboard and outboard wheel rims are bolted together.

The sensor device 10 is configured to acquire measurement data. The sensor device 10 may be configured to acquire a single type of measurement data, or multiple types of measurement data. In some examples the sensor device 10 comprises a set of multiple sensors, each of which may be configured to independently acquire measurement data. Each sensor in the set may acquire a different type of measurement data, or two or more sensors in the set may acquire the same type of measurement data. The sensor device 10 is configured to acquire distance measurement data, and in some examples may additionally be configured to acquire any or all of the following types of measurement data: tire gas temperature; tire pressure; acceleration; acoustic noise data; vibration data. The sensor device 10 may be configured to use any suitable known sensing technology to acquire the measurement data, depending on which type(s) of measurement data the sensor device 10 is intended to acquire. The architecture of the sensor device 10 is explained in detail below with reference to FIG. 4.

The sensor device 10 is configured to measure a distance between the sensor device 10 and an object remote from the sensor device. Such an object may be, for example, any or all of: the tire 14; the ground 16; a further component of the wheel assembly 1; a component of a vehicle in which the wheel assembly 1 is comprised. The illustrated example sensor device 10 is configured to measure a distance between the sensor device 1 and the inner circumferential surface of the tire 14 (when the tire 14 is mounted on the wheel 13) and also a distance between the sensor device 1 and the ground 16 (when the wheel assembly 1 is operating to support a vehicle).

In the illustrated example, the sensor device 10 is configured to measure a distance between the sensor device 10 and the remote object by emitting radiation 11 in a direction toward the remote object, and detecting reflections of the emitted radiation which are reflected by the remote object. The sensor device may be configured to emit the radiation 11 in the form of a beam of radiation. Such a beam of radiation may be directed to align with a radial direction of the wheel 13 when the sensor device 10 is attached to the wheel 13. The radiation 11 may be any type of radiation which will be at least partly reflected by the remote object to which it is desired to measure a distance. Suitable types of radiation may include light, radio waves, sound waves (e.g. ultrasound) or the like. In some examples (particularly examples in which the remote object comprises a metallic element) the sensor device 10 is a Hall effect sensor. The sensor device 10 may be configured to emit the radiation in discrete pulses and to detect the reflection of each pulse. Alternatively the sensor device 10 may be configured to continuously emit the radiation and to continuously detect the reflection during a time period.

Part (iii) of FIG. 1 shows the sensor device 10 emitting the radiation as a first beam 11 of radiation in a first direction which is towards the inner circumferential surface 141 of the tire 14. In this example the first direction is radially outward (with respect to the wheel 13). The first beam 11 may have a relatively narrow width, so that it is incident on a small area of the inner circumferential surface 141 of the tire 14, or a relatively wider width, so that it is incident on a larger area of the inner circumferential surface 141. In the illustrated example the sensor device 10 is also emitting a second beam 12 of radiation in a second, different direction which is towards an inner surface of the tire 14 (but not necessarily the inner circumferential surface 141). The second direction is at an acute angle to the first direction (that is, an angle between the first beam 11 and the second beam 12 is less than 90°). The second beam 12 is optional, and in some examples the sensor device 10 may be configured to only emit a single beam of radiation (which may be directed radially outwardly like the first beam 11, or at an angle to the radial direction like the second beam 12).

The second beam 12 may be substantially the same as the first beam 11 except for the angle at which it is emitted, or it may differ from the first beam 71 in terms of, for example, energy, wavelength, frequency, width, or any other property. The angle of the second beam 12 is such that it is incident on (and at least partially passes through) a side wall of the tire 14. By contrast, the first beam 11 is incident on a circumferential wall of the tire 14 (that is, a wall of the tire which is in contact with the ground 16). The angle of the second beam 12 may be selected in dependence on factors such as the configuration of the tire 14, the distance it is desired to measure using the second beam 12, or the like.

The second beam 12 may be configured to measure a different distance to the first beam 11. For example, the first beam 11 may be configured to measure a distance $d_1$, which is the shortest distance between the sensor device 10 and the inner circumferential surface 141 of the tire 14, whilst the second beam 12 is configured to measure a distance $d_2$ between the sensor device 10 and the ground 16. The distance $d_2$ is not the shortest distance between the sensor device 10 and the ground 16 because of the angle of the second beam 12. However; the shortest distance $d_3$ between the sensor device 10 and the ground 16 can be calculated from $d_2$ using trigonometry. In some examples, when the wheel assembly 1 is supported on the ground 16, a first part of the first beam 11 may be reflected by the inner circumferential surface of the tire 14 and a second part of the first beam 11 may be reflected by the ground 16. In such examples the first beam 11 may be used to measure both the distance $d_1$ and the distance $d_3$.

Figure 2:
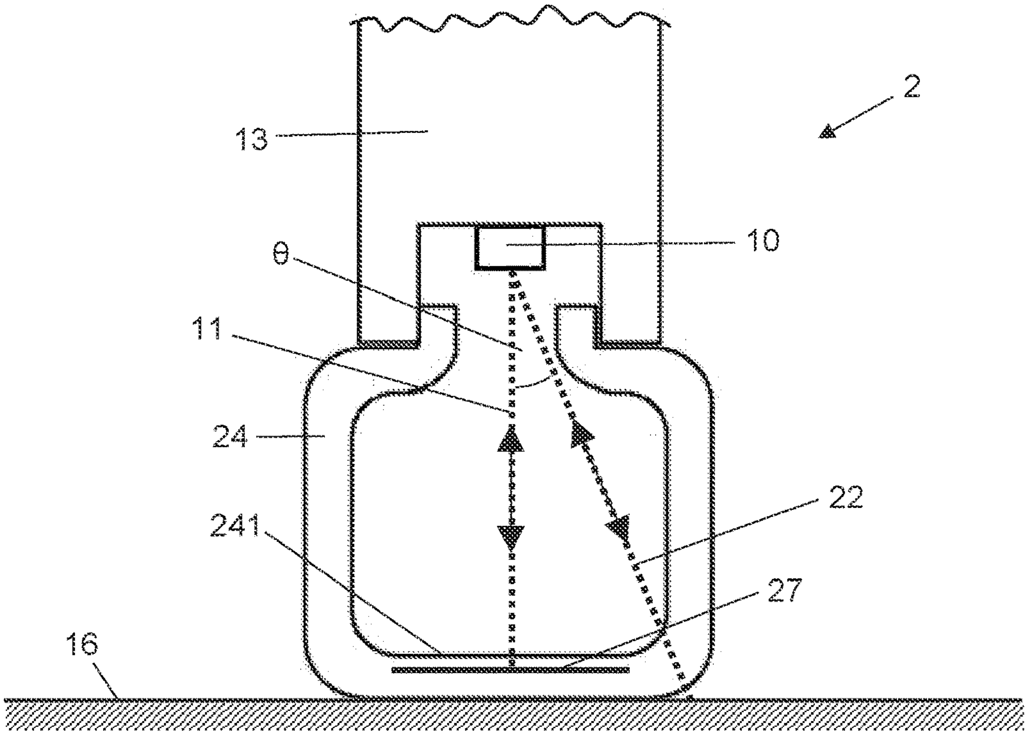
FIG. 2 is a schematic cross-section though an example wheel assembly according to the invention.

FIG. 2 illustrates the use of the example sensor device 10 on a particular example wheel assembly 2 in which the tire 24 comprises a circumferential portion of reflective material 27 which is configured to reflect a greater proportion of the emitted radiation than a material which forms the main body of the tire 24. In the illustrated example the portion of reflective material is embedded in the circumferential wall of the tire 24. In other examples the portion of reflective material may be disposed on the inner circumferential surface 241 of the tire 24. The portion of reflective material 27 is located at a known distance from the inner circumferential surface 241 of the tire 24, which may be zero (if the portion of reflective material is disposed on the inner circumferential surface 241) or which may be equal to the depth at which the portion of reflective material is embedded (if the portion of reflective material is embedded in the circumferential wall of the tire). This distance is not expected to change during operation of the tire 24, although the distance between the portion of reflective material 27 and an outer surface of the tire 24 is likely to change, due to treads of the tire 24 wearing down. The inner surface of the portion of reflective material 27 may be considered to be a reference circumferential surface of the tire 24. A distance between the sensor 10 and the inner circumferential surface 241 of the tire 24 can be calculated based on a measured distance between the sensor 10 and the inner surface of the portion of reflective material 27.

In the illustrated example the portion of reflective material is a reinforcing band which functions to strengthen the tire 24. In other examples the portion of reflective material need not provide any such structural function.

The sensor device 10 is configured to emit the first beam of radiation 11 radially outwardly, and is also configured to emit a second beam of radiation 22 at an angle θ to the first beam 11. The angle θ is selected such that the second beam 22 is not incident on the reinforcing band 27. The first beam 11 is incident on the reinforcing band 27. The reinforcing band 27 may be made of a metallic material which reflects substantially all of the part of the first beam 11 which is incident on the reinforcing band 27 (a part of the first beam 11 may be reflected by an inner circumferential surface 241 of the tire 24 before reaching the reinforcing band 27). The properties of the first beam 11 may be selected such that substantially all of the first beam 11 is incident on the reinforcing band 27 (that is none, or only a small part, of the first beam 11 is reflected by the inner circumferential surface 241 of the tire 24). The first beam 11 is configured to be used to measure the shortest distance between the sensor device 10 and the inner surface of the reinforcing band 27 (which is directly related to the shortest distance between the sensor device 10 and the inner circumferential surface 241 of the tire 24).

The second beam 22 is configured to measure a distance between the sensor device 10 and the ground 16. The properties of the second beam 22 are selected such that at least a part of the second beam 22 is incident on the ground 16. The properties of the second beam 22 may be selected such that substantially all of the second beam 22 is incident on the ground 16. The material of the reinforcing band 27 may have properties such that it would be impossible or impractical for the sensor device 10 to emit a beam of radiation that could even partially pass through the reinforcing band 27 to reach the ground 16. The angle θ of the second beam 22 therefore advantageously enables at least part of the second beam 22 to be incident on the ground 16, so that a distance between the sensor device 10 and the ground 16 can be measured. This would not be possible using the first beam 11 in this example, because of the blocking effect of the reinforcing band 27.

Returning to FIG. 1, the sensor device 10 may be attached to the wheel 13 in various different ways. In some examples (not specifically illustrated) the sensor device 10 is fixedly attached to the wheel 13 by any suitable mechanism. In such examples the fixed attachment is configured to prevent all relative movement between the sensor device 10 and the wheel 13. In other examples the sensor device 10 is configured to be movably attachable to the wheel 13 such that relative movement is permitted between the sensor device 10 and the outer circumferential surface 131 of the wheel. In particular, the sensor device 10 may be configured to be movably attachable to the outer circumferential surface 131 such that the sensor device 10 is able to continuously travel around the circumference of the wheel 13 in a given direction whilst the wheel remains stationary. This means that, conversely, the sensor device 10 is able to remain stationary whilst the wheel 13 rotates. In such examples preferably the attachment mechanism of the sensor device 10 to the wheel 13 substantially prevents axial, radial and pivotal movement of the sensor device 10 relative to the wheel 13.

A movable attachment of the sensor device 10 to the wheel 13 in various ways. For example, the sensor device 10 could be fixedly attached to a mounting band which is moveably mounted on the wheel 13 such that the mounting band is able to move circumferentially relative to the wheel 13. Such a mounting band may, for example, encircle the outer circumferential surface 131 of the hub part of the wheel 13. The circumferential movement may be facilitated, for example, by providing a low friction surface on one or both of an inner circumferential surface of the mounting band and the outer circumferential surface 131 of the wheel 13.

Figure 3I:
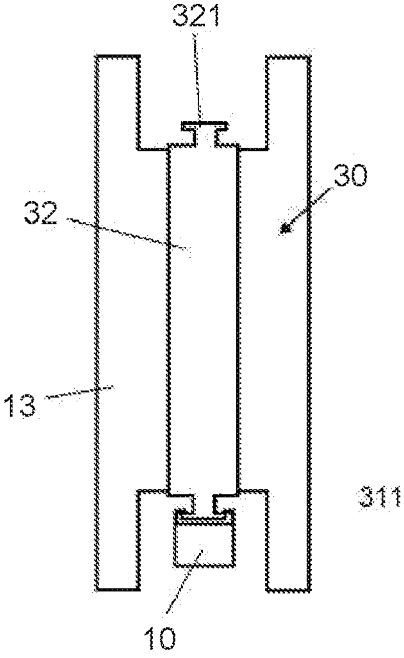
FIG. 3(*i*), FIG. 3(*ii*) and FIG. 3(*iii*) are a set of schematic views of an example sensor apparatus comprising the sensor device of FIG. 1, in isolation and installed on a wheel assembly.
Figure 3:
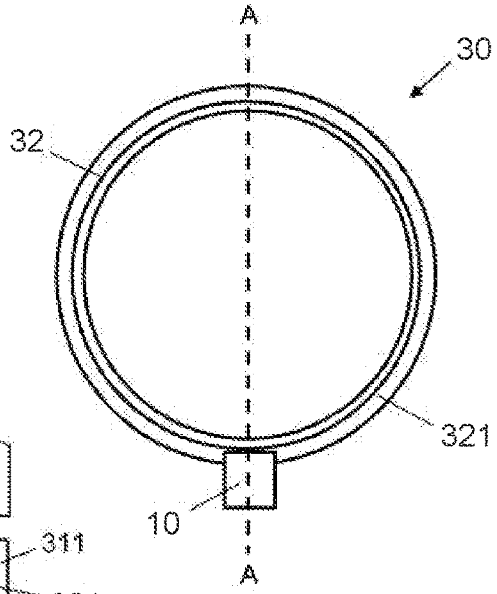

An alternative way of movably attaching the sensor device 10 to the wheel 13 is illustrated in FIG. 3. Part (ii) is a side view of an example sensor apparatus 30 comprising the sensor device 10 and a mounting member 32, and Part (i) is a cross-section of the sensor apparatus 30, taken along the line A-A, mounted on the wheel 13. Part (iii) is an expanded view of the region of Part (i) which shows the connection between the sensor device 10 and the mounting member 32. In Part (i) the sensor device 10 is shown positioned at the lowest point on the circumferential surface of the wheel 13. This is the position at which the sensor device 10 will be located in operation of the sensor device 10, when the wheel 13 is operating to support a vehicle and is either stationary or is rotating relatively slowly.

The mounting member 32 comprises a fixed mounting band configured to be fixedly attached to a circumferential surface of a wheel. The sensor device 10 is movably attached to the fixed mounting band 32 such that the sensor device 10 is able to move around the circumference of the fixed mounting band 32. The fixed mounting band 52 is a closed loop configured to encircle the circumferential surface 131 of the hub part 132 of the wheel 13. The diameter of the fixed mounting band 32 is substantially equal to the diameter of the circumferential surface of the hub part of the wheel 13, at least when the fixed mounting band 32 is mounted on the wheel 13. The diameter of the fixed mounting band 32 may be adjustable, to facilitate installing it onto the wheel 13.

An inner circumferential surface of the fixed mounting band 32 contacts the circumferential surface of the wheel 13. In some examples relative circumferential movement between the fixed mounting band 32 and the circumferential surface of the wheel 13 is prevented by mutually configuring the inner circumferential surface of the fixed mounting band 32 and the outer circumferential surface 131 of the wheel 13 to ensure a high coefficient of friction therebetween. In some such examples one or both of the inner circumferential surface of the fixed mounting band 32 and the outer circumferential surface 131 of the wheel 13 comprises a high-friction coating. In some examples the fixed mounting band 32 is configured to be tensioned when it is on the wheel 13. Alternatively or additionally, the fixed mounting band 32 may be configured to be fixed to the wheel 13 by an attachment mechanism such as a bonding agent, a mechanical interlock, and/or one or more fasteners. Any such attachment mechanism is selected to be suitable for an intended application of the sensor device 10.

The fixed mounting band 32 is substantially rigid and may be formed from any material appropriate to the particular application. The fixed mounting band 32 may comprise a continuous piece of material, or it may have a join. If the fixed mounting band 32 comprises a join, any joining mechanism used to form the join must be sufficiently robust and reliable to remain joined for at least a desired period (which may, for example, be equal to a battery life of a battery of the sensor device 10).

The sensor device 10 may be attached to the fixed mounting band 32 in any manner which enables the sensor device 10 to travel circumferentially around the fixed mounting band 32 when the sensor apparatus 30 is mounted on the wheel 13, whilst preventing relative radial and axial movement of the sensor device 10 and fixed mounting band 32. In the illustrated example, the fixed mounting band 32 comprises a circumferential rail 321 which extends completely around the circumference of the fixed mounting band 32. The sensor device 10 is movably mounted on the circumferential rail 321. The illustrated rail 321 has a T-shaped profile, although any other profile shape suitable for preventing radial and axial movement of the sensor device 10 relative to the fixed mounting band 32 could be used. In some examples the fixed mounting band 32 may comprise two or more circumferential rails. The rail 321 may be formed integrally with the main body of the fixed mounting band 32, or it may be fixedly attached to the main body of the fixed mounting band 32.

The sensor device 10 is contained within a housing which is configured to engage with the circumferential rail 321. The configuration of the housing is dependent on the configuration of the circumferential rail 321, because the housing is configured to mechanically interlock with the circumferential rail 321. In the illustrated example, the housing comprises a pair of L-shaped protrusions 311 extending from a radially-inner surface of the housing. The spacing of the L-shaped protrusions is selected such that the head of the T-shaped circumferential rail 321 is able to be received between the protrusions with little or no axial or radial clearance between the head of the circumferential rail 321 and the protrusions 311. The L-shaped protrusions 311 extend circumferentially by an amount sufficient to substantially prevent pivoting of the housing (and therefore of the sensor device 10) relative to the fixed mounting band 32. In other examples the illustrated configuration could be reversed—that is, the fixed mounting band comprises a pair of L-shaped circumferential rails and the housing comprises a T-shaped protrusion configured to be received between the L-shaped circumferential rails. The surfaces of the housing and the circumferential rail 321 which are in contact comprise bearing surfaces. These bearing surfaces may be configured to facilitate sliding therebetween, for example by comprising a low-friction material.

The mounting band 32 is configured to be installed on the wheel 13 before the tire 14 is fitted to the wheel 13, when the wheel 13 is in a disassembled state (that is, a state in which an inboard part and an outboard part of the wheel 13 are not joined together). The hub part 132 of either the inboard or the outboard part of the wheel 13 is inserted into the mounting band 32 such that the mounting band 32 encircles the hub part 132, and then the inboard and outboard parts of the wheel 13 are connected together. The sensor device 10 may be attached to the mounting band at the time of installing the mounting band 32 on the wheel 13, or it may be attached to the mounting band 32 after the mounting band 32 has been installed on the wheel 13. In some examples the mounting band 32 is tensioned after it has been arranged on the circumferential surface 131 of the hub part of the wheel 13. The installation may be performed manually by an operator, either during assembly of the wheel assembly 1 or during a maintenance process performed on the wheel assembly 1 (such as replacement of the tire 14).

Figure 4:
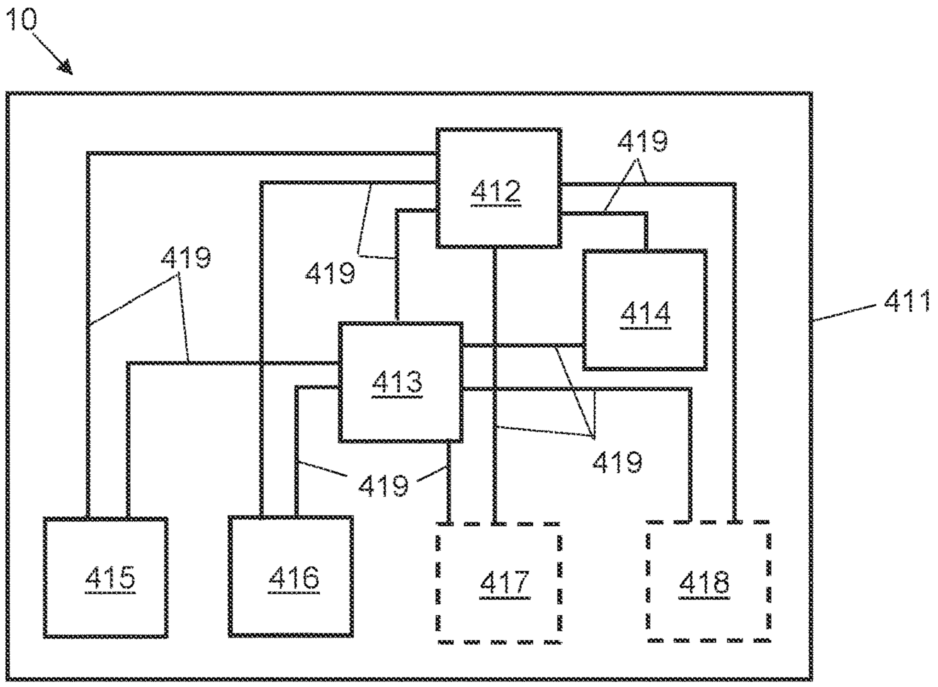
FIG. 4 is a schematic diagram of an example sensor package for a sensor device according to the invention.

FIG. 4 is a schematic illustration of the sensor device 10. The sensor device 10 is in the form of a sensor package comprising various functional components. In the illustrated example these components comprise first and second sensor components 415, 416; a wireless communications interface 414; a power source 413; and a sensor controller 412. Optionally, the sensor package may further comprise a fourth sensor component 417 and/or a fifth sensor component 418. The components of the sensor device 10 are contained within a housing 411. Wired connections 419 are present between various of the components 412-418. In particular, each of the components 412, 414, 415, 416, 417 and 418 has a wired connection 419 to the power source 413, via which that component receives electrical power. Each of the components 413-418 has a wired connection to the sensor controller 412 via which that component can receive and/or transmit data. Such data may comprise, for example, control signals, measurement data, operational status data, or the like.

The components 412-418 and wired connections 419 are all contained within the housing 411. The housing 411 is configured to protect the components 412-418 and connections 419 from the external environment, including from any impacts and vibrations that may be experienced during operation of the sensor device 10 on a vehicle. The material(s) and configuration of the housing 411 are selected to be suitable for the particular intended application of the sensor device 10. For example, if the sensor device 10 is intended for use on an aircraft wheel assembly, the housing 411 must be able to withstand the extremes of temperature that can be experienced in an aircraft tire (potentially between −55° C. and 275° C.). In some examples the housing 411 may comprise a thick layer of silicone rubber. The housing 411 may further comprise features configured to facilitate attachment of the sensor device 10 either directly to the wheel 13, or to a mounting member (such as the L-shaped protrusions discussed above in relation to FIG. 3).

The first sensor component 415 comprises a distance sensor configured to emit the radiation 11 and to detect a reflection of the emitted radiation, in any of the manners described above. The distance sensor may 415 comprise any suitable sensor technology. The distance sensor 415 is configured to receive power from the power source 413. The distance sensor 415 is configured to receive control signals from the sensor controller 412. Such control signals may be configured to, for example, trigger the distance sensor 415 to perform a distance measurement. The distance sensor 415 is configured to send measurement data to the sensor controller 412.

When there is no relative movement between the sensor device 10 and the wheel 13, the region of the inner circumferential surface 141 of the tire 14 on which the first beam 11 is incident does not change, so the distance sensor 415 can only acquire measurements for this particular region. However; when there is relative rotation between the sensor device 10 and the wheel 13, a complete circumferential section of the inner surface 141 of the tire 14 will pass through the area where the first beam 11 is incident. This enables the distance sensor 415 to scan a whole circumference of the tire inner surface 141.

The distance sensor 415 is configured to obtain two different types of measurement data: a distance between the distance sensor 415 and the inner surface of the tire 14 (or between the distance sensor 415 and a reference surface a known distance from the inner surface of the tire 14), and a distance between the distance sensor 415 and the surface 16. Various physical properties of the wheel assembly 1, and even of a vehicle in which the wheel assembly 1 is comprised, can be determined by operating the distance sensor 415 according to various predefined measurement protocols. Some such predefined measurement protocols require relative circumferential movement between the distance sensor 415 and the wheel 13 and others do not. The sensor controller 412 is pre-programmed with such predefined measurement protocols and is configured to operate the distance sensor according to a currently selected measurement protocol, by sending control signals to the distance sensor 415. Some example predefined measurement protocols are described below with reference to FIGS. 5-7.

The distance sensor 415 is be configured to perform a distance measurement using the first beam 11, and/or (in some examples) the second beam 12 in response to receiving a control signal from the sensor controller 412. The distance sensor 415 may be configured to apply a time-stamp indicating the time at which the measurement was performed to each measured distance value. The distance sensor 415 is configured to send measurement data comprising at least one measured distance value to the sensor controller 412. The distance sensor 415 is configured to receive electrical power from the power source 413.

The second sensor component 416 of the sensor device 10 comprises a movement detector. The movement detector 416 may be configured to detect absolute movement of the sensor device 10. In such examples the output of the movement detector 416 may be used (e.g. by a processor of the movement detector 416 or by the sensor controller 412) in conjunction with data from a wheel speed sensor to detect relative movement of the sensor device 10 and the wheel 13. Alternatively the movement detector 416 may be configured to directly detect relative movement between the sensor device 10 and the wheel 13. The movement detector 416 may use any suitable technology to detect the absolute or relative movement. In some examples the movement detector 416 comprises an accelerometer. In such examples the movement detector 416 may be configured to, alternatively or additionally, determine an orientation of the sensor device 10 relative to the ground 16. Such orientation information can indicate when the sensor device 10 is at its lowest possible position and may be useful, for example, to check the direction of the radiation beam(s) emitted by the distance sensor 415.

The movement detector 416 may be configured to perform a measurement in response to receiving a control signal from the sensor controller 412, or may be configured to automatically perform measurements at periodic intervals, or may be configured to continuously perform measurements. Performing a measurement may comprise a simple determination that movement (either relative or absolute) is or is not occurring at the time of the measurement. Performing a measurement may comprise measuring a value of one or more parameters of any detected movement (such as speed, direction, and the like). The movement detector 416 may apply a time-stamp indicating the time at which the measurement was performed to each measured value. The movement detector 416 is configured to send measurement data to the sensor controller 412. The measurement data may comprise, for example, any or all of: an indication of whether or not relative movement is present; a rate of relative movement; a rate of absolute movement. The movement detector 416 is configured to receive electrical power from the power source 413.

The power source 413 may be any type of power source suitable for supplying electrical power to the other components 412 and 414-418 of the sensor device 10. The power source 413 may comprise a battery, such as a lithium battery. Such a battery should have sufficient capacity to power the normal operation of all of the other components of the sensor device 10 for at least a maximum service interval of a wheel assembly on which the sensor device 10 is installed (that is, a longest time period that may elapse between maintenance processes performed on the wheel assembly). A battery comprised in the power source 413 may have sufficient capacity to power all of the components of the sensor device 10 for a selected time period which depends on the intended application of the sensor package 6. In some examples the power source 413 may comprise an energy harvesting device of any suitable type. In some examples the power source 413 may comprise both a battery and an energy harvesting device, in which case the capacity (and therefore the size) of the battery may be able to be smaller than if no energy harvesting device were present.

The wireless communications interface 414 is configured to be operated by the sensor controller 412 to both transmit data to, and receive data from, one or more other devices remote from the sensor device 10. The wireless communications interface 414 includes at least one transceiver. More than one transceiver may be provided, each using different wireless technology and/or arranged to transmit and receive over different ranges. Any suitable form or forms of wireless communications technology may be used by the wireless communications interface 414. The wireless communications interface 414 is configured to receive electrical power from the power source 413. The wireless communications interface 414 is configured to receive control signals (including data to be transmitted by the wireless communications interface 414) from the sensor controller 412.

The optional third sensor component 417 comprises a temperature sensor. The temperature sensor 417 is configured to directly measure the temperature of gas inside the tire. The temperature sensor 17 may be any suitable sensor for measuring gas temperature within a tire, such as a thermocouple. The temperature sensor 417 may be configured to perform a measurement in response to receiving a control signal from the sensor controller 412, or may be configured to automatically perform measurements at periodic intervals, or may be configured to continuously perform measurements. The temperature sensor 417 may be configured to apply a time-stamp indicating the time at which the measurement was performed to each measured pressure value. The temperature sensor 417 is configured to send measurement data comprising one or more measured temperature values to the sensor controller 412. The temperature sensor 417 is configured to receive electrical power from the power source 413.

The optional fourth sensor component 418 comprises a pressure sensor. The pressure sensor 418 may be any suitable sensor for measuring gas pressure inside a tire, for example a capacitive sensor. The pressure sensor 418 may be configured to perform a measurement in response to receiving a control signal from the sensor controller 412, or may be configured to automatically perform measurements at periodic intervals, or may be configured to continuously perform measurements. The pressure sensor 418 may be configured to apply a time-stamp indicating the time at which the measurement was performed to each measured pressure value. The pressure sensor 418 is configured to send measurement data comprising one or more measured pressure values to the sensor controller 412. The pressure sensor 418 is configured to receive electrical power from the power source 413.

The sensor controller 412 is configured to operate the other components of the sensor device 10. In some examples the sensor controller 412 is configured to determine whether or not there is relative circumferential movement between the sensor device 10 and the wheel 13 at the current time, and to alter its operation in dependence on the result of the determination. For example, the sensor controller 412 may be configured to operate in a first mode if there is relative movement between the sensor device 10 and the wheel 13, and in a second, different mode if there is substantially no relative movement between the sensor device 10 and the wheel 10.

The first mode may be a scanning mode, in which the sensor controller 412 operates the distance sensor 415 to continuously emit radiation and continuously detect reflections of the emitted radiation, during a time period in which there is relative circumferential movement between the sensor device 10 and the wheel 13. Emitting the radiation continuously may mean that the radiation is emitted as one long pulse having a duration at least as long as the time period, or it may mean that the radiation is emitted in a series of discrete pulses at frequent intervals during the time period. If the radiation is emitted as a series of discrete pulses, the time interval between consecutive pulses is preferably short. The time interval between consecutive pulses may be set by the sensor controller 412 in dependence on a current rate of relative circumferential movement between the sensor device 10 and the wheel 13, with a relatively shorter time interval being used for a relatively higher rate of relative circumferential movement.

In a scanning mode of operation, the sensor controller 412 may operate the distance sensor 415 in a manner suitable to acquire measurement data covering an entire circumference of the remote object to which the distance is being measured. For example, where the remote object is the circumferential wall of the tire 14, the sensor controller 412 may operate the distance sensor 415 to acquire measurement data covering a continuous circumferential section of the inner circumferential surface 141 of the tire 14. Acquiring sufficient measurement data to cover an entire circumference may be achievable in a single rotation of the wheel 13 relative to the sensor device 10, or it may require multiple rotations of the wheel 13 relative to the sensor device 10.

The sensor controller 412 may be configured to receive data from one or more remote systems, such as an aircraft avionics system, via the wireless communications interface 414. Such data may relate to current operational conditions of a vehicle in which the wheel assembly is comprised. In some examples the sensor controller 412 may be configured to receive current wheel speed data from a remote system. In some examples the sensor controller 412 is configured to receive control commands from a remote system, for example configured to cause the sensor controller 412 to operate in a particular manner.

The sensor controller 412 comprises a processor and a memory unit. The memory unit may be used to store computer program instructions for execution by the processor; and data, such as measurement data received from the sensor components 415-418. The memory unit may include non-volatile rewritable storage, such as flash memory which can retain data without requiring applied power. Alternatively, volatile storage, which is kept powered by the power source 413, may be employed; or combinations of read-only and rewritable storage. The memory unit of the sensor controller 412 may be configured to store a history of measurement data received from one or more of the sensor components 415-418. The history may be stored for a predetermined amount of time, which may be at least as long as a maximum time between manual wheel assembly maintenance operations. The predetermined amount of time may therefore be determined based on the intended application of the sensor package 6. This can ensure that enough history is held to provide details since the last manual wheel assembly maintenance operation, so that the history can be transferred for use in trend analysis, along with the current measurement data. Longer periods of history may also be kept.

In some examples the sensor controller 412 is configured to operate the wireless communications interface 412 to send control signals to a remote indicating device, for example located at a position on the vehicle which is visible from the outside of the vehicle. Alternatively the remote indicating device may be a mobile device configured to be used by an operator to periodically interrogate the sensor controller 412. The remote indicating device may be configured to provide information about the condition of the wheel assembly to maintenance crews, and may use any suitable indicating technology to provide the indication.

In some examples the sensor controller 412 is configured to operate the wireless communications interface 414 to communicate data with other sensor apparatus mounted on other wheel assemblies of the same vehicle. In such examples, one sensor apparatus of the set of sensor apparatus installed on the vehicle may be configured to collate data from all of the sensor apparatus and to send a control signal based on the collated data to a single remote indicating device. For example, if any of the measurement data acquired by any of the sensor apparatus indicates that maintenance of a wheel assembly is required, the control signal may cause the indicating device to indicate that maintenance is required. Such an arrangement reduces the need for an operator to check each wheel assembly individually.

In some examples the sensor controller 412 may be configured to operate the wireless communications interface 414 to communicate data with a further system of a vehicle in which the wheel assembly is comprised. Where the vehicle is an aircraft, for example, such a further system may be a cockpit system for providing information to flight crew, or an avionics system.

The sensor controller 412 may be configured to operate, at any given time, the other components of the sensor device 10 according to a predefined measurement protocol. The sensor controller 412 may be pre-programmed with a set of two or more measurement protocols, and may be configured to select a particular measurement protocol to use at a given time. The predefined measurement protocols are stored in the memory unit of the sensor controller 412. The sensor controller 412 may be configured to select a particular measurement protocol based on any one or more of: a command signal received by the sensor controller 412 (e.g. from a remote system); a relative rotation state of the sensor device and the wheel (which may be a current relative rotation state or a predicted future relative rotation state); a parameter relating to the operation of a vehicle on which the sensor device 10 is installed. Such a parameter relating to the operation state of a vehicle may be, for example, flight phase (if the vehicle is an aircraft); speed; altitude; or the like.

One or more of the predefined measurement protocols may only be suitable for use when there is relative circumferential movement between the sensor device 10 and the wheel 13, in which case the sensor controller 412 may be configured to select such a measurement protocol only when it has determined (e.g. based on measurement data received from the movement detector 416) that relative movement is occurring at the current time. For example, at least one of the predefined measurement protocols pre-programmed onto the sensor controller 412 may be a scanning measurement protocol which requires the sensor controller 412 to operate the distance sensor 415 according to the scanning mode described above. Other of the predefined measurement protocols may require no relative movement of the sensor device 10 and wheel 13 to be occurring, or may not care whether or not relative movement is occurring. For example, for some of the types of measurement data able to be acquired by the sensor device 10 (such as pressure and temperature) it is irrelevant whether there is relative movement between the sensor device 10 and the wheel 13.

The set of pre-programmed measurement protocols may include a damage measurement protocol. An example damage measurement protocol comprises emitting radiation such that it is incident on a substantially full width of an inner surface of a tire mounted on the wheel, and detecting reflections of the emitted radiation from the substantially full width of the inner surface of the tire, continuously over a time period in which the sensor device moves around at least a full circumference relative to the wheel. The damage measurement protocol is therefore a scanning measurement protocol.

Figure 5:
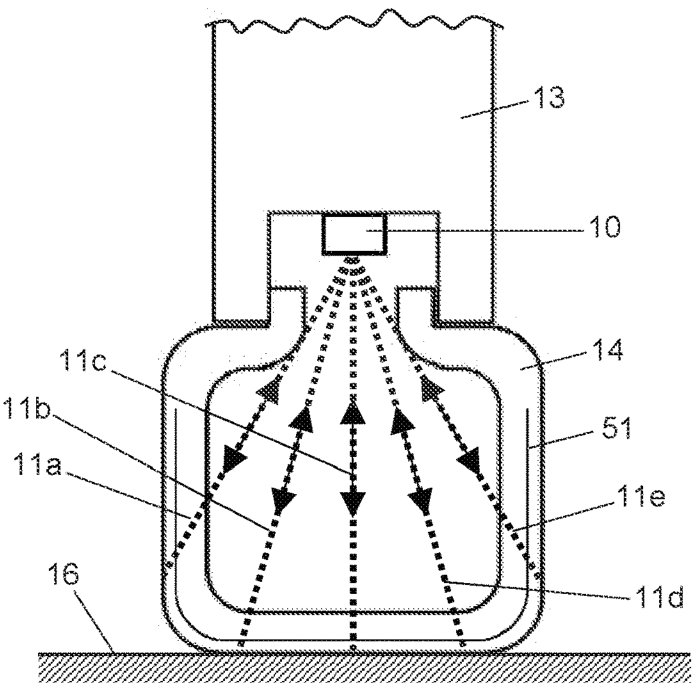
FIG. 5 shows the example sensor device of FIG. 1 implementing a damage measurement protocol.

FIG. 5 illustrates an example beam arrangement suitable for implementing the damage measurement protocol. In the example beam arrangement five separate beams of radiation 11*a-e* are emitted by the sensor device 10 (in particular, by the distance sensor 415). Each beam 11*a-e* is at a different angle to the radial direction of the wheel 13. In the illustrated example the central beam 11*c* is aligned with the radial direction, but this need not be the case in other examples. The angle of the outermost beams 11*a*, 11*e* is selected in dependence on the configuration of the wheel assembly 1 and the extent of the surface of the tire 14 for which it is desired to acquire measurement data. A wider angle would cover more of the tire surface, whereas a narrower angle would cover less. Although each beam 11*a-e* is shown as being very narrow for ease of illustration, in practice it is desirable for each beam 11*a-e* to be wide enough that adjacent beams abut or overlap where they are incident on the object to which distance is being measured. In other examples a single very wide beam of radiation could be used instead of multiple narrower beams.

Each of the beams 11*a-e* of radiation is substantially identical all respects, except for the direction of emission. The properties of the beams 11*a-e* are selected such that a significant part of each beam is reflected at an outer wall of the tire 14. The emitted radiation may be reflected by an interface between the tire material and the surrounding air, and/or may be reflected by an interface between the tire material and the ground 16. At least some of the radiation which is reflected at the outer wall of the tire 14 is detected by the distance sensor 415. The signal detected by the distance sensor 415 will be altered if the outer wall of the tire 14 within the region from which the detected reflections originate is damaged in any way (for example if a cut is present). The sensor controller 412 is programmed with appropriate signal analysis algorithms to determine whether damage is present based on the detected signal, and is configured to use these algorithms when operating according to the damage detection measurement protocol.

The tire 14 optionally comprises a portion of reflective material 51 arranged to make any damage to the tire easier to detect based on the detected reflections. For example, such a portion of reflective material may comprise a continuous coating on the outer surface of the tire 14, which is configured to become discontinuous if the tire experiences damage. Alternatively the portion of reflective material 51 could be embedded in the tire material, as is the case in FIG. 5. The portion of reflective material is disposed at a predetermined distance from the outer surface of the tire 14 (in an unworn condition of the tire 14). In this case a detected discontinuity in the reflective material would indicate that the damage had penetrated into the tire wall to at least the predetermined distance. The location of the portion of reflective material 51 can be selected such that significant damage requiring maintenance is detected, whilst normal wear and tear is not.

The damage measurement protocol is a scanning measurement protocol, meaning that the controller 412 is configured to implement it only when there is relative circumferential movement between the sensor device 10 and the wheel 13. The time period during which the radiation is emitted according to the damage measurement protocol is preferably long enough for measurement data covering a continuous complete circumference of the tire 14 to be acquired. The length of the time period therefore depends on the rate of relative circumferential movement of the sensor device 10 and wheel 13, and on whether the radiation is emitted as a single long pulse or a series of discrete pulses, as described above. The controller 412 may be configured to determine a length for the time period based on at least these factors. Alternatively the controller 412 may be configured to cause the distance sensor 415 to emit the radiation for as long as relative movement between the sensor device 10 and wheel 13 is occurring.

The set of pre-programmed measurement protocols may include a tread depth measurement protocol. An example tread depth measurement protocol comprises emitting the first beam 11 of radiation such that it is incident on the inner circumferential surface 141 of the tire and detecting reflections of the first beam 11 from the inner circumferential surface 141; and emitting the second beam of radiation 12 such that it is incident on the ground 16 and detecting reflections of the second beam 12 from the ground 16. The tread depth measurement protocol may be implemented either as a scanning measurement protocol (if there is relative rotation between the sensor device 10 and wheel 13 at the time of implementing the tread depth measurement protocol), or as a static measurement protocol (if there is no relative rotation between the sensor device 10 and wheel 13 at the time of implementing the tread depth measurement protocol).

Figure 6:
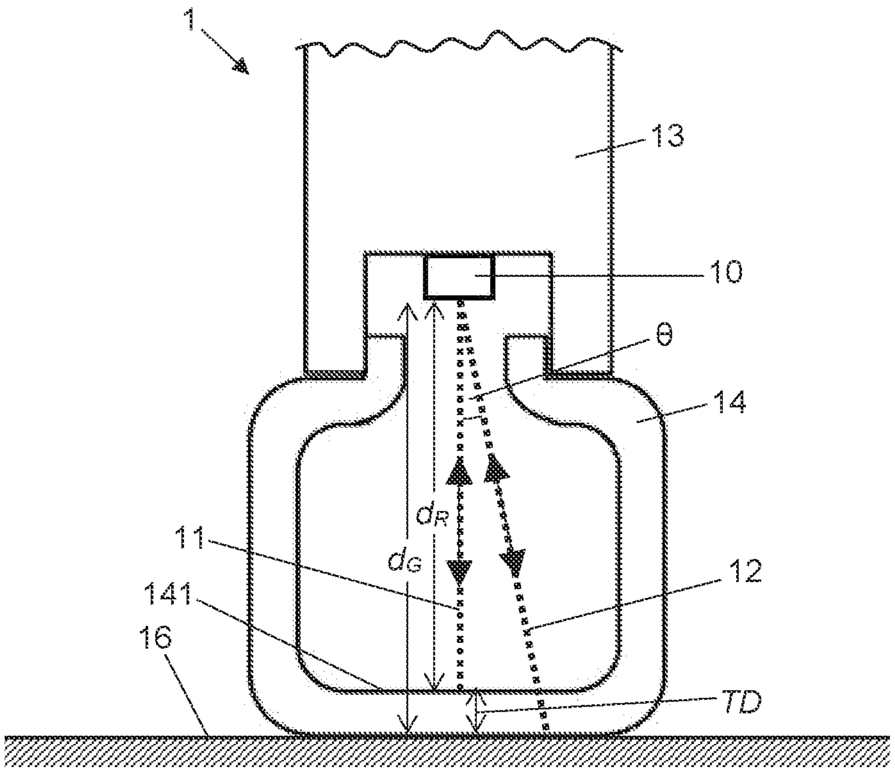
FIG. 6 shows the example sensor device of FIG. 1 implementing a tread depth measurement protocol.

The tread depth measurement protocol may be implemented using either the beam arrangement shown in FIG. 2, or the beam arrangement shown in FIG. 6. In the FIG. 6 beam arrangement the angle θ between the first and second beams 11, 12 is relatively small such that the second beam 12 passes through the circumferential wall of the tire 14. In some examples the angle θ between the first and second beams 11, 12 may be zero. This beam arrangement is suitable when the circumferential wall of the tire 14 does not contain any reflective material which would block the second beam 12 from reaching the ground 16. In examples where the circumferential wall of the tire 14 does contain reflective material, as described above in relation to FIG. 2, the FIG. 2 beam arrangement should be used.

The first beam 11 is configured such that it will be at least partly reflected from a reference surface of the tire 14. In the FIG. 6 example the reference surface is the inner circumferential surface 141 of the tire 14. In the FIG. 2 example the reference surface is the inner surface of the reflective reinforcing band 27. As discussed above, the reference surface has a known radial distance from the inner circumferential surface 141 of the tire 14 (which may be zero). The second beam 12 is configured such that it will be at least partly reflected from the ground 16. The first and second beams 11, 12, may differ in their properties. For example, the second beam 12 may be configured such that a relatively higher proportion of the second beam 12 (as compared to the first beam 11) passes through the wall of the tire 14. The distance sensor 415 detects first reflections of the first beam 11 from the reference surface 141, 27 and second reflections of the second beam 12 from the ground 16, and is configured to distinguish between the first reflections and the second reflections.

The sensor controller 412 is configured to determine a shortest distance $d_R$ between the sensor device 10 and the reference surface 141, 27 based on the first reflections, and to determine a shortest distance $d_G$ between the sensor device 10 and the ground 16 based on the second reflections, in the manner described above in relation to FIGS. 1 and 2. The sensor controller 412 is further configured to determine the difference TD between $d_R$ and $d_G$. The sensor controller 412 stores a reference value for TD, which represents an unworn condition of the tire 14. A difference between a current value of TD (that is, a value based on current measurement data) and the reference value of TD is indicative of the wear state of the tire 14 at the circumferential location on the tire 14 for which the current measurement data was acquired. The sensor controller 412 may be configured to compare the difference between the current TD and the reference TD to a predefined threshold, and to determine whether the difference is indicative of a requirement for maintenance based on the results of the comparing.

If the tread depth measurement protocol is implemented as a scanning measurement protocol, then measurement data covering an entire circumference of the tire 14 is acquired, during a period in which there is relative circumferential movement between the sensor device 10 and the wheel 13, in the manner described above in relation to the tire damage measurement protocol. It may be advantageous to determine current TD for an entire circumference of the tire 14 because it is possible for the tire 14 to wear unevenly, such that the current TD at a first circumferential location is acceptable according to the predefined threshold whilst the current TD at a second, different circumferential location is unacceptable.

If the tread depth measurement protocol is implemented as a static measurement protocol, at a time when there is no relative circumferential movement between the sensor device 10 and the wheel 13, then a current value of TD can be determined only in respect of the circumferential location of the tire 14 on which the first and second beams 11, 12 are incident at the time of implementing the tread depth measurement protocol. A static tread depth measurement protocol may be suitable for applications where the tire 14 is expected to wear very evenly, such that TD is not expected to vary significantly with circumferential location.

The tread depth measurement protocol may also be used to detect “flat spots” on a tire. Such flat spots are local deformations of the tire tread, which may occur for example as a result of skidding or wheel lock.

The set of pre-programmed measurement protocols may include a load measurement protocol. An example load measurement protocol comprises emitting radiation such that it is incident on a reference circumferential surface of a tire having a known distance from an inner circumferential surface of the tire, and detecting reflections of the emitted radiation from the reference circumferential surface of the tire. The reference circumferential surface may have any of the features of the example reference surfaces discussed above. The load measurement protocol may be performed at any time when the wheel assembly is supporting the vehicle, regardless of whether relative movement between the sensor device 10 and the wheel 13 is occurring.

Figure 7I:
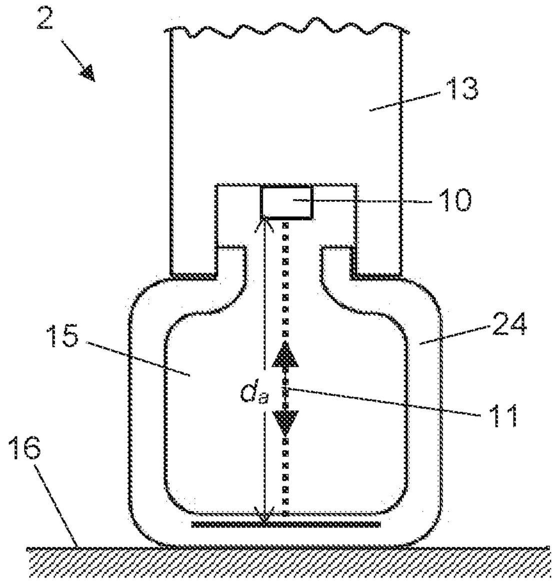
FIG. 7(*i*) and FIG. 7(*ii*) show the example sensor device of FIG. 1 implementing a load measurement protocol.
Figure 7:
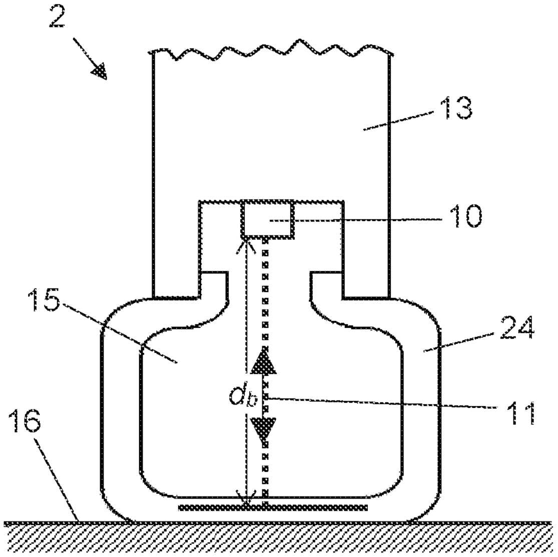

The load measurement protocol may be implemented using a single beam 11 of radiation, as shown in FIG. 7 using the example wheel assembly 2. In the illustrated example the single beam of radiation is the first beam 11 described above, and is emitted in a radial direction of the wheel 13, although this need not be the case in other examples. In order to measure load it is necessary to determine the shortest distance between the sensor device 10 and the reference surface (which in the illustrated example is the reinforcing band 27). This shortest distance is measured directly by the first beam 11. However; the shortest distance between the sensor device 10 and the reference surface 27 may also be determined using a beam of radiation which is at an angle to the radial direction of the wheel (such as the second beam 12 of FIG. 2), provided that angle is known, by applying a trigonometric calculation to the measured distance as discussed above.

The distance between the sensor device 10 and the reference surface 27 varies in dependence on the vertical load on the wheel assembly 2 (which depends on the weight of the vehicle being supported by the wheel assembly 2, as well as the properties of the gas in the space 15 inside the tire). For a given set of tire gas properties, when the vehicle is heavier, the load is greater and the tire 24 deforms (squashes) more such that the distance between the sensor device 10 and the reference surface 27 reduces. In other words, the distance between the sensor device 10 and the reference surface 27 is inversely proportional to the load, enabling the load to be calculated based on a measurement of the distance between the sensor device 10 and the reference surface 27, if the gas properties are known. Part (i) of FIG. 7 shows the wheel assembly 2 supporting a relatively smaller vehicle weight and Part (ii) shows the wheel assembly 2 supporting a relatively greater vehicle weight. It can be seen that the distance $d_a$ between the sensor device 10 and reference surface 27 in Part (i) is greater than the equivalent distance $d_b$ in Part (ii).

As mentioned above, he amount of deformation experienced by the tire 24 in response to a given vertical load depends on the properties (i.e. temperature and pressure) of the gas in the space 15 inside the tire 24. More deformation will be experienced for a given change in load if the tire pressure is relatively lower. The sensor controller 412 is therefore configured to calculate the load on the wheel assembly 2 additionally based on the tire pressure at the time at which the distance between the sensor device 10 and the reference surface 27 was measured. In some examples the sensor controller 412 is configured to receive current tire pressure information from a further system, such as a dedicated tire pressure monitoring system of the vehicle. In examples in which the sensor device comprises the pressure sensor 418 the load measurement protocol may comprise measuring tire pressure using the pressure sensor 418 substantially simultaneously with emitting the radiation (with the distance sensor 415) to measure the distance between the sensor device 10 and the reference surface 27.

The sensor controller 412 may calculate the load on the wheel assembly using any suitable technique. For example, the sensor controller 412 may store a look-up table of distances, tire pressures and loads in its memory, and may calculate the load based on this look-up table. Alternatively the sensor controller 412 may be pre-programmed with an algorithm configured to calculate a load using a current distance value and a current tire pressure value.

In some applications each wheel assembly of the vehicle will comprise a sensor device 10, meaning that a load can be calculated for each wheel assembly. In some examples the sensor controller 412 is configured to transmit a calculated load value which results from implementing the load measurement protocol to a further system (such as an aircraft avionics system). The further system may receive a load value for each wheel assembly of the vehicle. The further system may be configured to use the received load values to calculate one or more overall vehicle parameters such as the total weight of the vehicle, the centre of gravity of the vehicle, or the like.

The sensor controller 412 may be configured to automatically implement the load measurement protocol in response to certain operational conditions of the vehicle being met, for example when an aircraft is ready for push back from a gate. Alternatively or additionally the sensor controller 412 may be configured to implement the load measurement protocol in response to a control signal received from a further system, such as a remote maintenance device or a cockpit control system. For example, a pilot of an aircraft may trigger implementation of the load measurement protocol when an aircraft is ready for push back, to check that its weight and/or weight distribution is within acceptable limits.

Figure 8:
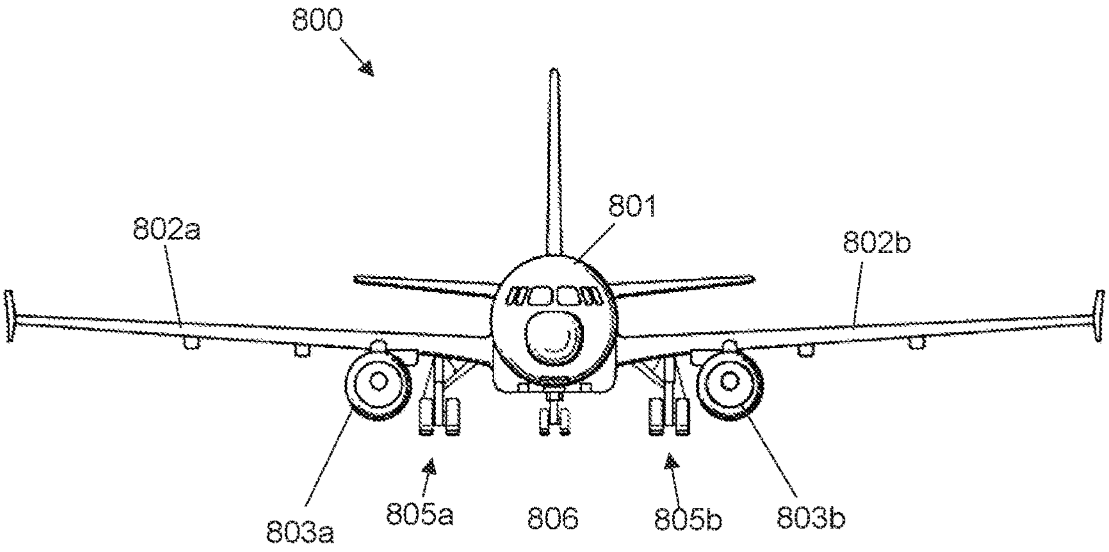
FIG. 8 is a front view of an example aircraft comprising a sensor apparatus according to the invention.

FIG. 8 is a front view of an example aircraft 800 which comprises at least one sensor device according to the invention. The aircraft 800 comprises a pair of wings 802*a*, 802*b* and a fuselage 801. The wings 802*a*, 802*b* each carry an engine 803*a*, 803*b* respectively. The aircraft 800 is supported on the ground by a pair of main landing gear (MLG) 805*a*, 805*b* and a nose landing gear (NLG) 806. Each landing gear assembly 805*a*, 805*b*, 806 comprises a pair of wheel assemblies. Each wheel assembly of the aircraft 800 may have the same features as the example wheel assembly 1 of FIG. 1 or the example wheel assembly 2 of FIG. 2. The wheel assemblies of the aircraft 800 are shown in contact with the surface 16, which in this example is an airport surface such as a runway. This aircraft has six wheel assemblies in total; four wheel assemblies as part of the MLG 805*a*, 805*b* and two wheel assemblies as part of the NLG 806. The aircraft 800 may therefore comprise up to six sensor devices according to the invention (one per wheel assembly). It will generally be advantageous to provide a sensor device on each wheel assembly of an aircraft or other vehicle. Other models of aircraft may have different numbers of wheel assemblies and hence different numbers of sensor apparatus. The aircraft 800 also comprises various further systems, including an avionics system, which may be in communication with at least one of the sensor devices.

Figure 9:
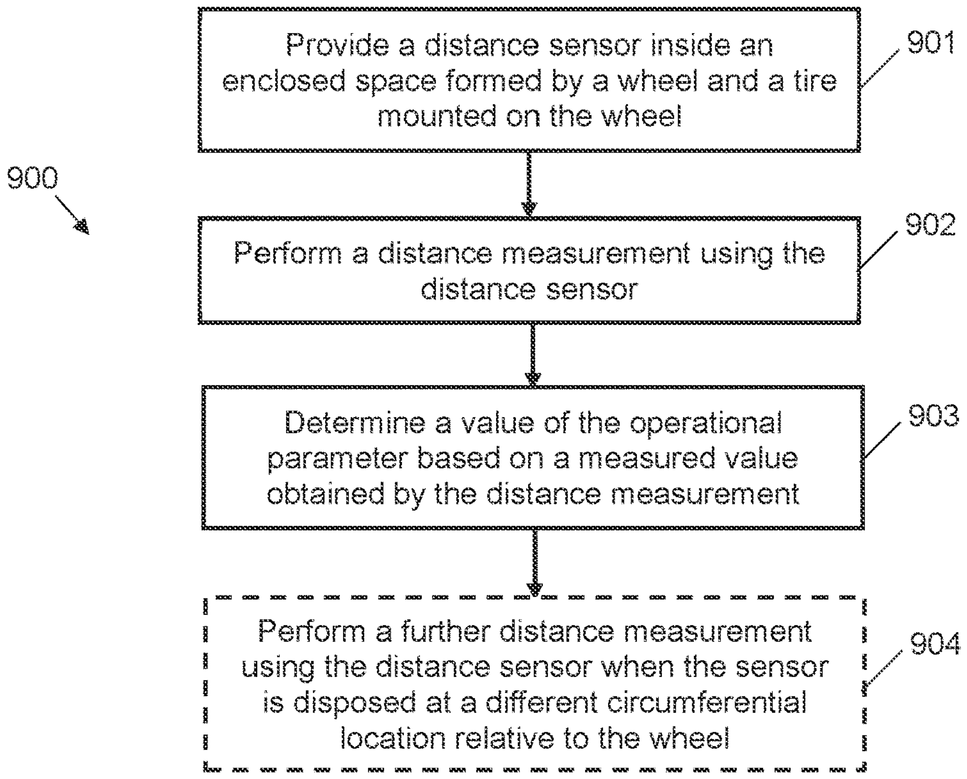
FIG. 9 is a flow chart illustrating an example method of determining an operational parameter of a vehicle, according to the invention

FIG. 9 is a flow chart illustrating an example method 900 of determining an operational parameter of a vehicle. The method is configured to be performed using a sensor device according to the invention, such as the example sensor device 10 described above.

A first block 901 comprises providing a distance sensor in an enclosed space formed by a wheel of the vehicle and a tire mounted on the wheel. The sensor may be comprised in a sensor device according to the invention. The distance sensor may be, for example, the distance sensor 415 described above. Providing the distance sensor may comprise attaching the distance sensor to the wheel, in any of the manners described above. In some examples providing the distance sensor comprises attaching the distance sensor to the wheel such that it is able to move around the circumference of wheel. Block 901 may be performed during manufacture of the wheel assembly, and/or during a maintenance of the wheel assembly. Block 901 may be performed, for example, during a process of installing a tire on the wheel. Block 901 may be performed manually by an operator.

A second block 902 comprises performing a distance measurement using the distance sensor. The distance measured is a distance between the sensor and an object remote from the sensor, which may be any of the example objects discussed above. The distance measurement may be performed in any of the manners described above in relation to the example distance sensor 415. Performing the distance measurement may comprise measuring a first distance and a second, different distance. The distance measurement is performed when the sensor is disposed at a first circumferential location relative to the wheel. The first circumferential location may be any location on the circumference of the wheel. Block 902 may be performed automatically as a result of instructions pre-programmed onto the distance sensor or onto a different component of a sensor device in which the distance sensor is comprised. Block 902 may be performed in response to the distance sensor or a sensor device in which the distance sensor is comprised receiving a control signal configured to trigger performance of block 902 from a further system.

A third block 903 comprises determining a value of the operational parameter based on the measured distance. The operational parameter may be a parameter of a wheel assembly in which the wheel and tire are comprised, or of a vehicle in which such a wheel assembly is comprised. The operational parameter may be, for example, tire tread depth, tire condition, wheel assembly load, vehicle weight, vehicle centre of gravity or the like. The operational parameter may be determined in any of the manners described above. The operational parameter may be determined based on the measured distance in combination with one or more further measured or predicted values.

In some examples of the method 900 (such as examples in which the distance sensor is fixedly attached to the wheel and/or examples in which the distance sensor is being used to implement a static measurement protocol), the method 900 is complete when the performance of block 903 is complete.

In other examples (such as examples in which the distance sensor is movably attached to the wheel and is being used to implement a scanning measurement protocol) the method 900 comprises an optional fourth block 904. In block 904 a further distance measurement is performed when the sensor is disposed at a second, different circumferential location relative to the wheel. Block 904 is implementable by sensor devices which are attached to the wheel such that relative circumferential movement between the sensor device and the wheel is permitted.

The further distance measurement is of the same distance or distances as the first distance measurement and is performed in the same manner as the first distance measurement. The second circumferential location may be separated from the first circumferential location, or it may be adjacent to the first circumferential location. The sensor may be at substantially the same location relative to a vehicle in which the wheel and tire are comprised during the performance of the distance measurement and during the performance of the further distance measurement.

Between performing the distance measurement and performing the further distance measurement the wheel is rotated about its axis. The amount by which the wheel is rotated corresponds to the circumferential separation of the first and second circumferential locations. The wheel (and therefore a vehicle in which the wheel is comprised) may undergo translational movement between the performance of the distance measurement and the performance of the further distance measurement. The amount of the translational movement may correspond to the amount by which the wheel is rotated between the performance of the distance measurement and the performance of the further distance measurement. The rotation of the wheel may be as a result of the normal operation of a wheel assembly in which the wheel is comprised to support and/or drive movement of the vehicle.

The change in the relative circumferential position of the distance sensor and the wheel occurs because the distance sensor experiences substantially no rotational movement when the wheel rotates between the performance of the distance measurement and the performance of the further distance measurement. This is because the distance sensor is free to move circumferentially around the wheel, and because the force of gravity acting on the sensor acts to resists movement of the sensor away from its lowest possible position (that is, the position closest to the ground).

The rotation of the wheel which occurs between the performance of the distance measurement and the performance of the further distance measurement is at a sufficiently low rate that the centrifugal force on the distance sensor does not overcome the force of gravity on the sensor. In examples of the method 900 which include optional block 904, the wheel may rotate continuously during performance of the method 900, at a sufficiently low rate that the centrifugal force on the sensor does not overcome the force of gravity on the sensor.

Examples of the method 900 which include optional block 904 may comprise performing a series of distance measurements, the series including the distance measurement and the further distance measurement. In such examples each distance measurement of the series is performed when the sensor is at a different circumferential location relative to the wheel. The different circumferential locations are distributed around the circumference of the wheel. In some examples the different circumferential locations may be substantially evenly distributed around the circumference of the wheel. In some examples the circumferential separation between each of the different circumferential locations is small enough that substantially all of the circumference of the wheel is covered by the series of distance measurements. Examples of the method 900 which comprise performing a series of distance measurements may be completed once distance measurements have been acquired which cover substantially all of the circumference of the wheel. The method 900 may comprise repeatedly performing the series of measurements for as long as the wheel is rotating at a sufficiently low speed. The method 900 may comprise repeatedly performing the series of measurements until the sensor receives a control signal configured to stop the sensor from performing measurements.

Although the invention has been described above with reference to one or more preferred examples or embodiments, it will be appreciated that various changes or modifications may be made without departing from the scope of the invention as defined in the appended claims.

Although the invention has been described above mainly in the context of a fixed-wing aircraft application, it may also be advantageously applied to various other applications, including but not limited to applications on vehicles such as helicopters, drones, trains, automobiles and spacecraft.

Where the term "or" has been used in the preceding description, this term should be understood to mean "and/or", except where explicitly stated otherwise.

The invention claimed is:

1. A sensor system for use in determining at least one property of a wheel assembly comprising a tire mounted on a wheel, the sensor system including:
- a sensor device configured to be attachable to an outer circumferential surface of the wheel which faces an inner circumferential surface of the tire; and configured to measure a distance between the sensor device and an object remote from the sensor device, and
- a sensor controller configured to operate the sensor device according to a predetermined measurement protocol, wherein the sensor controller is configured to select the predetermined measurement protocol from a set of two or more predetermined measurement protocols stored on a non-transitory memory of the sensor controller, based on at least one of:
  - a command signal received by the sensor controller;
  - a relative rotation state of the sensor device and the wheel; or
  - a parameter relating to the operation of a vehicle on which the wheel assembly is installed.

2. The sensor system according to claim 1, wherein the sensor device is configured to measure at least one of:
- a distance between the sensor device and the inner circumferential surface of the tire, when the tire is mounted on the wheel; or
- a distance between the sensor device and the ground, when the wheel assembly is operating to support a vehicle.

3. The sensor system according to claim 1, wherein the sensor device is configured to be movably attachable to the outer circumferential surface of the wheel such that the sensor device is able to continuously travel around the circumference of the wheel in a given direction whilst the wheel remains stationary.

4. The sensor system according to claim 1, wherein the sensor device is configured to emit radiation in a direction toward the remote object when the sensor device is attached to the wheel; and to detect a reflection of the emitted radiation.

5. The sensor system according to claim 4, wherein the sensor device is configured to continuously emit the radiation and to continuously detect the reflection during a time period in which there is relative circumferential movement between the sensor device and the wheel.

6. The sensor system according to claim 4, wherein the sensor device is configured to emit the radiation in the form of a beam directed to align with a radial direction of the wheel when the sensor device is attached to the wheel.

7. The sensor system according to claim 1, wherein the sensor device is configured to emit a first beam of radiation in a first direction which is towards the inner circumferential surface of the tire when the sensor device is attached to the wheel, and a second beam of radiation in a second, different direction which is towards the inner circumferential surface of the tire when the sensor device is attached to the wheel.

8. The sensor system according to claim 7, wherein an angle between the first beam and the second beam is less than 90°.

9. The sensor system according to claim 1, wherein at least one of the predetermined measurement protocols in the set is a scanning measurement protocol suitable for use only when there is relative rotation between the sensor device and the wheel.

10. The sensor system according to claim 1, wherein the predetermined measurement protocol is at least one of:

a damage measurement protocol;

a tread depth measurement protocol; or a load measurement protocol.

11. The sensor system according to claim 10, wherein the predetermined measurement protocol includes the damage measurement protocol and the damage measurement protocol comprises operating the sensor device such that the radiation is incident on a full width of an inner surface of the tire which is mounted on the wheel, and detecting reflections of the emitted radiation from the full width of the inner surface of the tire, continuously over a time period in which the sensor device moves around at least a full circumference relative to the wheel.

12. The sensor system according to claim 10, wherein the tread depth measurement protocol comprises:

emitting a first beam of radiation such that the first beam is incident on an inner surface of a tire mounted on the wheel and detecting reflections of the first beam from the inner surface; and emitting a second beam of radiation such that the second beam is incident on a support surface in contact with an outer surface of the tire and detecting reflections of the second beam from the support surface.

13. The sensor system according to claim 10, wherein a load measurement protocol comprises:

emitting radiation such that the radiation is incident on a reference circumferential surface of the tire, the reference circumferential surface having a known distance from an inner circumferential surface of the tire, and detecting reflections of the radiation from the reference circumferential surface of the tire.

14. The sensor system according to claim 1, wherein the sensor device is further configured to measure one or more of: tire pressure; tire gas temperature; and acceleration.

15. The sensor system according to claim 13, wherein the sensor device is further configured to measure tire pressure, and wherein the load measurement protocol further comprises measuring the tire pressure substantially simultaneously with emitting the radiation.

16. A wheel and sensing assembly comprising:

a wheel having an outer circumferential surface configured to face an inner circumferential surface of a tire mounted on the wheel;

a sensor device attached to the outer circumferential surface of the wheel, wherein the sensor device is configured to determine at least one property of the tire mounted on the wheel and the sensor device faces the inner circumferential surface of the tire and the sensor device is configured to measure a distance between the sensor device and an object remote from the sensor device, and a sensor controller configured to operate the sensor according to a selected predetermined measurement protocol which is selected from a set of predetermined measurement protocols stored in a non-transitory memory of the sensor controller, wherein the selection is based on at least one of:

a command signal received by the sensor controller;

a relative rotation state of the sensor device and the wheel, or a parameter relating to the operation of a vehicle on which the wheel assembly is installed.

17. The wheel and sensing assembly according to claim 16, wherein the sensor device is configured to emit radiation towards the inner circumferential surface of the tire and the wheel and sensing assembly further comprises the tire mounted on the wheel, wherein the tire comprises a circumferential portion of reflective material which is configured to reflect a greater proportion of the radiation than a material which forms a main body of the tire.

18. The wheel and sensing assembly according to claim 16, wherein the wheel assembly is an aircraft wheel assembly.

19. An aircraft comprising the wheel and sensing assembly according to claim 18.

20. The aircraft according to claim 19, further comprising an avionics system in communication with at least one of the sensor device or the sensor controller.

21. A method of determining an operational parameter of a vehicle, the method comprising:

providing a distance sensor in an enclosed space formed by a wheel of the vehicle and a tire mounted on the wheel, wherein the distance sensor includes a sensor controller and a memory;

selecting by the sensor controller a predetermined measurement protocol from predetermined measurement protocols stored on the memory based on one or more of:

a command signal received by the sensor controller;

a relative rotation state of the sensor device and the wheel, or a parameter relating to operation of the vehicle, performing a distance measurement using the distance sensor according to the predetermined measurement protocol; and determining a value of the operational parameter based on the measured distance.

22. The method according to claim 21, wherein the sensor is mounted on the wheel and the distance measured is a distance between the distance sensor and an object remote from the distance sensor.

23. The method according to claim 21, wherein the performing the distance measurement includes:

performing distance measurements for a first group in the series of distance measurements when the distance sensor is disposed at a first circumferential location relative to the wheel; and performing distance measurements for a second group in the series of distance measurements when the distance sensor is disposed at a second, different circumferential location relative to the wheel.

24. The method according to claim 23, wherein the wheel is rotated about an axis of the wheel between the performing distance measurements for the first group and the performing the distance measurements for the second group.

25. The method according to claim 23, comprising performing a series of distance measurements, the series including the distance measurement and the further distance measurement, wherein each of the distance measurements of the series is performed when the sensor is at a different circumferential location relative to the wheel, and wherein the different circumferential locations are distributed around the circumference of the wheel.

* * * * *